Oct. 17, 1933.  S. A. HUMPHREY  1,931,409

METHOD FOR MAKING MOISTURE RESISTING DECORATED PANNED CANDY

Filed March 27, 1933

Inventor
Samuel A. Humphrey
By
Attorney

Patented Oct. 17, 1933

1,931,409

UNITED STATES PATENT OFFICE 1,931,409

METHOD FOR MAKING MOISTURE RESISTING DECORATED PANNED CANDY

Samuel A. Humphrey, Portland, Oreg.

Application March 27, 1933. Serial No. 662,961

1 Claim. (Cl. 107—54)

Figure 1:
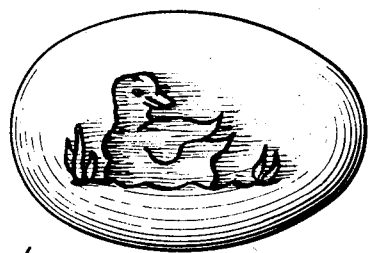

My invention relates to the decoration of so-called "panned" candies with some attractive design, as for example, birds, animals or flowers in color. Since panned candy-pieces are especially intended for children, it is desirable that they have some figured decoration. It renders the candy-pieces more attractive and interesting. But heretofore—according to my knowledge, and I am a practical candy maker—such decoration could not be successfully applied. The reason was, the designs could not be fixed on the candy pieces. The pure food regulations naturally forbid the use of any color on candies not conforming with the food and drug act. These colors however being made up mainly with water as the solvent, are therefore very susceptible to moisture. Therefore, if the fingers handling the candies decorated with designs are the least bit moist, the touch by the fingers of the decoration will cause the design to become smeared and unsightly, as graphically illustrated by Fig. 1 in the accompanying drawing, constituting a part of this specification. Such smearing not only detracts from the appearance of the candy, but gives it the appearance of being unclean, and unfit to eat. Furthermore, the imprinted design is so susceptible to moisture that it is difficult to pack the candy without defacing the design, unless the candy be handled with great care, which of course would slow up the packing.

The object of my invention is so to fix the design on the candy as to resist defacement by moisture transmitted from the fingers in handling the candy.

I attain my object by the following method:

First, the bodies, or centers, of the candy-pieces are cast. These pieces are then given a primary coat, or casing, by being put in a revolving pan and built up by a sugar compound, in the customary method employed in the candy making trade, known as "panning". After such panning the candy pieces are seasoned. During the seasoning time the design is placed on the candy.

If the piece of candy to be decorated is of egg, or similar, shape, the design may be imprinted on it by a rubber stamp provided with concaved, inverted cup-like elastic printing web, which will readily conform to the contour of the candy body.

The imprinting of the design on the candy piece is done by the use of colors known to the trade as "U. S. P. certified colors".

After the design has been imprinted on the candy-piece the pigment composing the same is set by rolling the candy-piece in, or otherwise applying thereto, powdered sugar, corn starch, or other edible material having moisture absorbing, drying properties similar to the materials mentioned.

Then the seasoning of the piece of candy is continued until it is dry. In other words, the seasoning is carried to the "right stage" as the candy maker would describe it.

The candy piece is then finished by again placing it in a revolving pan and given a second exterior hard coating or casing with sugar compound by the panning process; after which the candy may be polished. In that way, the candy piece is encased in a transparent, moisture-proof hard coat or shell, thru which the design is clearly seen, and the candy may be handled with impunity.

Figure 2:
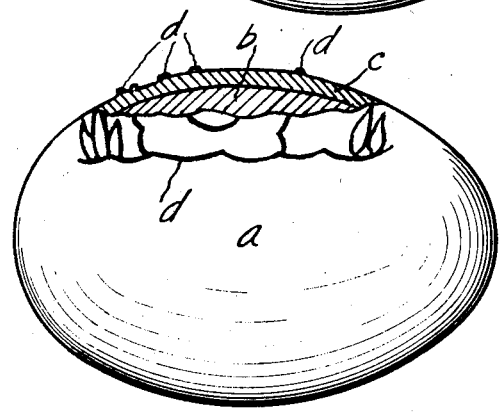
Figure 3:
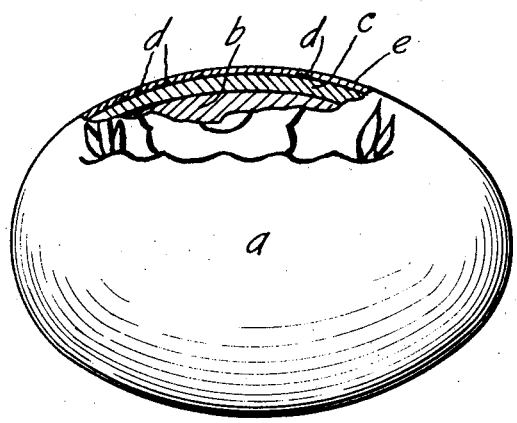
Figure 4:
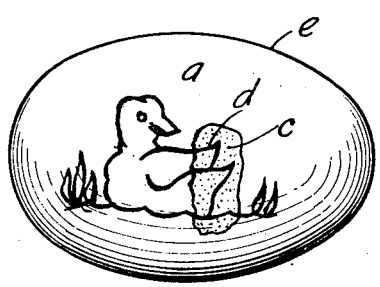

The above described steps of my method are diagrammatically illustrated in the accompanying drawing:

Fig. 2 shows, diagrammatically, an egg-shaped piece of candy $a$ which has been panned to encase or coat its body, or center, $b$ with a primary coat or case $c$, on which the design has been imprinted by stamping. The lines of the design are diagrammatically indicated by the marks $d$ in Figs. 2 and 3. It is assumed that the candy piece has been given a partial rotation away from the observer with reference to Fig. 4, so as to bring the design from a central position, as shown by Fig. 4, to the top of the piece of candy; in that way facilitating the diagrammatic illustration of my invention;

Fig. 3 diagrammatically shows the same candy piece with the outer coat or casing $e$ applied; and Fig. 4 shows the piece of candy decorated with the design and finished; the design having been set and protected against injury by touching with moist fingers, as above mentioned.

In brief, by my method the moisture susceptible design is covered, encased and protected by the transparent hard outer coat or shell $e$. But the outer coat may not be applied until the imprinted design has first been set by a material possessing moisture absorbing drying properties. And the color of the primary coat must of course be adapted to stand out the design.

Instead of decorating the candy-piece with a design, one or more colors may be applied to cover its entire body, over said first or primary coat.

I claim:

The method of protecting against defacement by moisture of water-color decoration of a candy-piece, consisting in encasing the body of the candy with a primary coat of sugar compound, placing the color pigment constituting the decoration on said coat, permitting said coat to season, setting the decorating pigment by an edible moisture absorbing, and drying material during said seasoning, and encasing the whole candy in an outer, transparent, hard shell of sugar compound.

SAMUEL A. HUMPHREY.